United States Patent [19]
MacKelvie

[11] 3,724,301
[45] Apr. 3, 1973

[54] TOOL HOLDER ASSEMBLY
[75] Inventor: Philip A. MacKelvie, Denver, Colo.
[73] Assignee: Multi-Point Tool Co., Inc., Commerce City, Colo.
[22] Filed: Oct. 21, 1971
[21] Appl. No.: 191,508

[52] U.S. Cl. ................................................82/36
[51] Int. Cl. .........................................B23b 29/26
[58] Field of Search .....................82/36, 36 A, 37

[56] References Cited
UNITED STATES PATENTS

| | | | |
|---|---|---|---|
| 3,434,377 | 3/1969 | Stone | 82/37 |
| 3,368,449 | 2/1968 | Robinson | 82/36 |
| 3,103,839 | 9/1963 | Mancuso | 82/36 |

*Primary Examiner*—Leonidas Vlachos
*Attorney*—Sheridan, Ross & Fields

[57] ABSTRACT

A tool holder assembly is provided for positioning any one of a plurality of tools for use on a work piece in a lathe, the assembly including a tool holder mountable on a tool block which has a pair of mounting faces. A first abutment extends from one face spaced from the vertical centerline thereof a first distance and a second abutment extends from the other face spaced a second and different distance from the centerline of that face. The tool holder is reversibly mountable on either face and has two pairs of adjustable set screws, the first pair being spaced a first equal distance on opposite sides of the vertical centerline of the locating face of the tool holder which first distance is equal to the spacing of the first abutment from the centerline of the one face of the tool block and the second pair spaced a second equal distance on opposite sides of the vertical centerline of the locating face of the tool holder which second distance is equal to the spacing of the second abutment from the centerline of the second face. With this structure, the tool holder may be adjustably mounted on either face and it may be reversed in so that it is useable with as many as four tools.

8 Claims, 6 Drawing Figures

PATENTED APR 3 1973 3,724,301

TOOL HOLDER ASSEMBLY

BACKGROUND OF THE INVENTION

1. Field of the Invention

This invention relates to a tool holder assembly, and more particularly to a tool holder assembly wherein a tool holder may be mounted on a tool post in as many as four positions to facilitate use with any one of four tools.

2. Description of the Prior Art

In order to perform different work operations on a work piece on a lathe, a multiplicity of tools are required which must be individually positioned, as on a tool post. Various attempts have been made to provide a tool post which will receive a tool holder in one of several positions for holding more than one tool. In such devices the tool post is provided with at least two faces which are adapted to support the tool holder selectively on either of the faces. Commonly, a pair of adjustment screws are provided, one adjustment screw adjusting the height of the tool holder when in engagement with one of the faces on the tool block and the other adjustment screw adjusting the height of the tool holder when it is in engagement with the other face of the tool post. One such device is disclosed in U. S. Pat. No. 3,368,449 to Robinson and entitled "TOOL POST FOR LATHES." Although these devices have found considerable commercial success, a shortcoming thereof has been the fact that they are limited to a maximum of two tools and in many machine operations is necessary to use more than two tools on the work piece in order to complete the work. Thus, the operator is faced with the necessity of removing one tool holder and replacing it with another which is time consuming and reduces production rates.

SUMMARY OF THE INVENTION

In accordance with this invention a tool holder assembly is provided which comprises a tool block mountable on a lathe and including a first and second generally vertical faces which have equal lengths and are adapted to removably and reversibly support a tool holder. A first abutment extends from the first face adjacent the lower edge thereof and spaced a first distance from the vertical centerline of the first face and a second abutment extends from the second face adjacent the lower edge thereof and spaced a second distance from the vertical centerline of the second face. A tool holder which has first and second ends is reversibly mountable on either face of the tool block and includes a locating face having a length equal to the length of the first and second vertical faces and is selectively engageable with and vertically slidable along either of the first and second faces. In addition, the tool holder includes a first adjustable stop adjacent the locating face and spaced the first distance to one side of the vertical centerline of the locating face and extending from one side of the longitudinal centerline thereof for engagement with the first abutment to support the tool holder in a first adjusted position for using a first tool mountable at the first end of the tool holder. The tool holder further includes a second adjustable stop adjacent the locating face and spaced the first distance to the opposite side of the vertical centerline of the locating surface and extending from the opposite side of the longitudinal centerline for engagement with the first abutment to support the tool holder in a second adjusted position in which the tool holder is turned end for end from the first adjusted position for using a second tool mountable at the second end of the tool holder. Furthermore, the tool holder includes a third adjustable stop adjacent the locating face and spaced the second distance to one side of the vertical centerline of the locating surface and extending from the one side of the longitudinal centerline and engageable with the second abutment to support the tool holder in a third adjusted position for using a third tool mountable at the first end of the tool holder.

More particularly, the tool holder includes a pair of recessed central flanges extending along a central portion of the longitudinal centerline which face in opposite directions therefrom and are formed by relieving the central portion of the locating face. A first pair of threaded apertures are provided, spaced a first distance on opposite sides of the vertical centerline of the locating face, one of the apertures being located in each flange for receiving adjustment screws which serve as the first and second adjustable stops. A second pair of threaded apertures are provided, spaced a second and greater distance on opposite sides of the same vertical centerline, one of the apertures being located in each flange for receiving adjustment screws which serve as third and fourth adjustable stops. Furthermore, the tool holder may include means for releasibly blocking the tool holder on the tool block in any one of the adjusted positions.

With such an arrangement it can be seen that the tool holder may be mounted in any one of four adjustable positions, i.e., it may be mounted in a first position on one face of tool post with one tool in working position or may be reversed end for end on the same face with a tool on the opposite end of the tool holder in work position. Also, it may be moved to the other face of the tool holder to position a third tool at the first end in a working position or reversed end for end on the second face to position another tool at the opposite end of the tool holder in work position. Advantageously, the differential spacing of the abutments on the tool post faces together with the two pairs of spaced adjustment screws on the tool holder provides a means for individually adjusting the tool holder for each tool for use on a work piece in a lathe.

The term "vertical" as used throughout the specification and claims is intended only to indicate the spacial orientation of the various components which make up the tool holder assembly, it being understood that for some applications the tool block may be mounted in some position which is not vertical.

Additional advantages of this invention will become readily apparent from the description which follows, taken in conjunction with the accompanying drawings.

DESCRIPTION OF THE PREFERRED EMBODIMENTS

Figure 1:
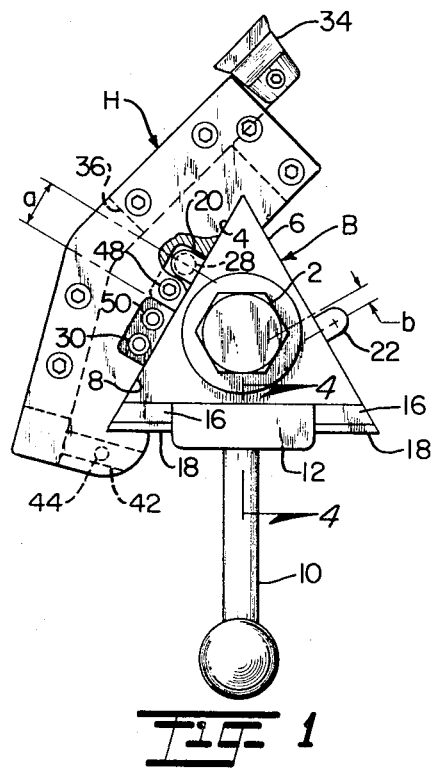
FIG. 1 is a top plane view of a tool holder assembly of this invention showing a tool holder mounted in one position on a tool block, with parts broken away for clarity of illustration.

In accordance with this invention a tool holder assembly is provided which includes a tool post B on which a tool holder H is adapted to be mounted in any one of several selected positions. Tool block B is mounted on a post 10, as on a lathe (not shown), in fixed position. The block may be of any desired shape as long as it has at least a pair of mounting faces of equal length which can be flat or curved. As illustrated, the block is shown to have a triangular shape with a first mounting face 4 and a second mounting face 6 which are of equal length. The tool block holder has a locating face 8 whose length is the same length as faces 4 and 6 so that the tool block holder may be mounted in the position shown on face 4 or may be reversed end for end on face 4 or it may be mounted on face 6 in a first position or in a reversed end for end position thereby providing four different positions in which holder H can be mounted.

Figure 4:
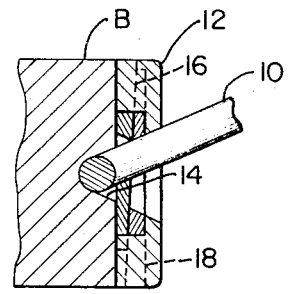
FIG. 4 is an enlarged vertical section, taken along line 4—4 of FIG. 1, showing a means for locking the tool holder on the tool post.
Figure 3:
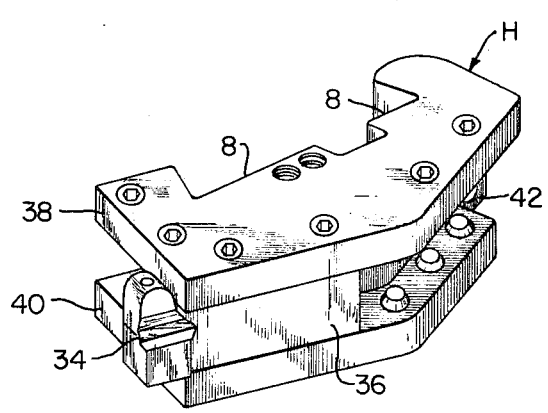
FIG. 3 is a perspective view of the tool holder of FIGS. 1 and 2.

The holder is held in a locked position against either face 4 or face 6 by depressing handle 10 which extends through a locking post 12 on tool block B and is pivotally mounted in a recess 14, as seen in FIG. 4. A pair of reversed wedges 16 and 18 are mounted between locking post 12 and tool block B as shown in FIG. 3, wedge 16 being slidably movable upon pivotal movement of handle 10. Thus, when handle 10 is depressed wedge 16 will be moved downwardly thereby urging wedge 18 outwardly against locking post 12. This movement causes the length of face 4 to be extended slightly to provide a wedging action which holds the tool holder H tightly on tool block B. Thus, it will be seen that the edges of wedges 16 and 18 form a portion of faces 4 and 6 respectively. Conveniently, locking post 12 may be connected to tool block B by means, such as screws, not shown.

Figure 2:
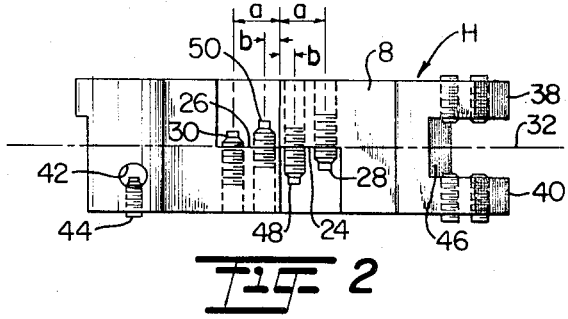
FIG. 2 is a side elevation of the tool holder of FIG. 1, showing the arrangement of the adjustment screws therein.

Conveniently, mounting face 4 is provided with an abutment 20 extending from a lower edge thereof spaced a distance $a$ from the vertical centerline of face 4 whereas mounting face 6 is provided with an abutment 22 which is spaced a distance $b$ from the vertical centerline of face 6. Advantageously, as best seen in FIGS. 1 and 2, tool holder H is provided with two pairs of adjustment stops or screws which are mounted in threaded apertures extending through flanges 24 and 26 formed by relieving the upper and lower central portion of locating face 8. The first set of adjustment screws 28 and 30 respectively from flange 24 and flange 26 and are spaced at distance $a$ from the vertical centerline of locating face 8, as best seen in FIG. 2. Conveniently, each of flanges 24 and 26 lie along the longitudinal centerline 32 of tool holder H.

From FIG. 1, it can be seen that when the tool holder is in the position shown adjustment screw 28 will engage abutment 20 and by turning adjustment screw 28 in its threaded aperture it can be adjusted to position the tool holder at the appropriate height to properly position a tool 34 for use on a work piece (not shown). As seen in FIG. 3, the tool 34 is mounted on a shank 36 which is received in a slot formed between flanges 38 and 40 of tool holder H and is held in place by set screws, as shown. It is apparent, another tool can be inserted between the flanges to extend from the opposite end of tool holder H which tool can be placed in a work position when the tool holder is mounted so that it is in engagement with mounting face 6 of tool block B. Furthermore, at one end of tool holder H is a transverse bore 42 provided with a set screw 44 for holding a tool with a circular shank in place. This tool will be brought into position when tool holder H is turned end for end from the position shown in FIG. 1 so that set screw 30 is in engagement with abutment 20. Obviously, set screws 28 and 30 can be individually adjusted to individually position the height of tool 34 and a tool which extends through transverse bore 42 thereby eliminating the necessity for making separate adjustments each time the operator wants to switch from one tool to the other.

A fourth tool may be placed in slot 46 formed between the ends of flanges 38 and 40.

A second set of adjustable set screws 48 and 50 extend from flanges 24 and 26, respectively, each set screw being spaced a distance $b$ from the vertical centerline of locating face 8 and are selectively adapted to engage abutment 22 when tool holder H is positioned in engagement with mounting face 6 of tool block B. Of course, abutment 22 is spaced the same distance $b$ from the vertical centerline of mounting face 6. Thus, when a tool extends from the opposite end of the tool holder as tool 34 it will be positioned by engagement of set screw 48 with abutment 22 whereas when the tool is turned end for end so as to bring a tool within slot 46 into position set screw 50 will engage abutment 22. As described above, with respect to set screws 28 and 30 and abutment 20 the tool holder can be selectively adjusted for each of the tools to be used when the tool holder is in engagement with mounting face 6 so that it is unnecessary for the operator to make a new adjustment each time he switches from one tool to another. Thus, it can be seen that a maximum of four tools can be positioned in the tool holder and used alternatively on the same work piece. In many applications, it will be more practical to use only three tools in the tool holder at one time but it is understood that four tools can be positioned in the tool holder for some types of work.

Figure 5:
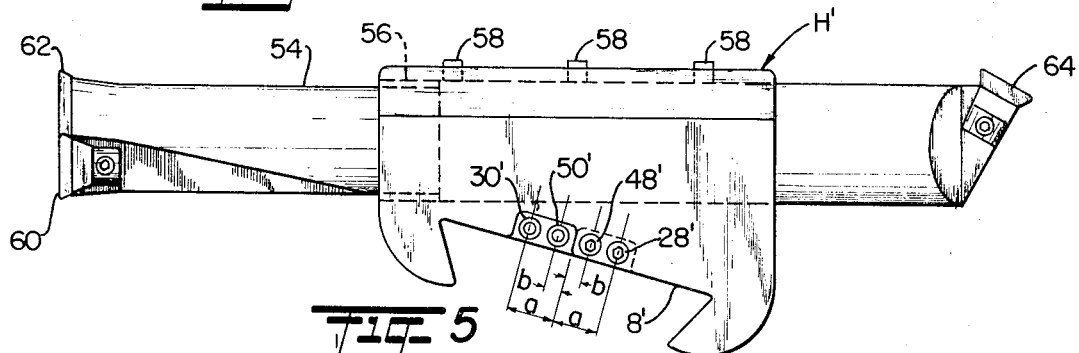
FIG. 5 is a top plane view of an alternative tool holder for use with this invention and for receiving a diametrically opposed double end boring bar.
Figure 6:
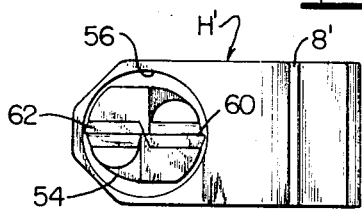
FIG. 6 is a left end view of of the boring bar and tool holder of FIG. 5.

An alternative tool holder H' is shown in FIGS. 5 and 6 which is adapted to receive a diametrically opposed double end boring bar 54 received in a longitudinal bore 56 within holder H' and held in place by a plurality of set screws 58. Tool holder H' includes a locating face 8' which is adapted to engage either mounting face 4 or mounting face 6 of tool block B and includes a first pair of adjustable set screws 28' and 30' spaced a distance $a$ from the vertical centerline of the locating face and a second pair of adjustable set screws 48' and 50' spaced a distance $b$ from the vertical centerline of locating face 8'. Conveniently, boring bar 54 is provided at one end with a pair of oppositely positioned tools 60 and 62. Tool 60 will be in a work position when tool holder H' is mounted so that it engages mounting face 6 of tool block B with adjustment screw 48' in engagement with abutment 22. Tool 62 will be brought into position when the tool holder is in engagement with mounting face 4 of tool block B and adjustment screw 30' is in engagement with abutment 20.

The opposite end of boring bar 54 is provided with a tool 64 which is in work position when the tool holder H' is turned end for end on face 4 of tool block B so as to bring adjustment screw 28' into engagement with abutment 20. It can be seen that as in the previous embodiment each set screw can be individually adjusted to position the respective tools so that no further adjustment is necessary when the operator changes from one tool to the next. With this embodiment a maximum of three tool positions are possible.

From the foregoing, the advantages of this invention are readily apparent. A tool holder assembly has been provided which comprises a tool block having two mounting faces for receiving a tool holder which may be mounted end for end on either face to provide a total of four positions. The tool block has an abutment extending from the lower edge of each mounting face, one abutment being spaced a distance *a* from the vertical centerline of its face and the second abutment being spaced a second distance *b* from the vertical centerline of its face. The tool holder is provided with two pairs of set screws. One screw of each pair extends from a flange facing in opposite directions from a longitudinal centerline of the tool holder. Thus, when the tool holder is mounted on one mounting face one adjustment screw will engage the first abutment and position a first tool in position to operate on a work piece. When the tool holder is turned end for end the second set screw of the pair will be in engagement with the first abutment to bring a second tool into position. Likewise, when the tool holder is placed in engagement with the second mounting face of the tool block a first one of the second pair of set screws will engage the second abutment to position a third tool and when the tool holders turn end for end the second set screw of the second pair will be brought into engagement with the second abutment to position a fourth tool.

In one embodiment a tool holder H is provided with flanges for receiving tools in various positions and has a transverse bore for receiving a circular shank tool whereas in a second embodiment a tool holder H' is provided with a longitudinal bore for receiving a diametrically opposed double end boring bar for positioning any one of three tools in operative position.

The invention has been described in detail with particular reference to preferred embodiments thereof, but it will be understood that variations and modifications can be effected within the spirit and scope of the invention.

What is claimed is:

1. A tool holder assembly for selectively positioning any one of a plurality of tools for use with a lathe, said assembly comprising:
   a tool block mountable on a lathe, said tool block including:
      first and second generally vertical mounting faces having equal lengths for removably supporting a tool holder;
      a first abutment extending from said first mounting face adjacent the lower edge thereof and spaced a first distance from the vertical centerline of said first mounting face;
      a second abutment extending from said second mounting face adjacent the lower edge thereof and spaced a second distance from a vertical centerline of said second mounting face; and
   a tool holder having first and second ends for supporting a plurality of tools and reversibly mountable on either mounting face of said tool block, said tool holder including:
      a locating face having a length equal to the length of said first and second mounting faces and selectively engageable with and vertically slidable along either of said first and second mounting faces;
      a first adjustable stop adjacent said locating face and spaced said first distance to one side of the vertical centerline of said locating surface and extending from one side of the longitudinal centerline thereof for engagement with said first abutment to support said tool holder in a first adjusted position for using a first tool mountable at said first end of said tool holder;
      a second adjustable stop adjacent said locating face and spaced said first distance to the opposite side of said vertical centerline of said locating surface and extending from the opposite side of said longitudinal centerline for engagement with said first abutment to support said tool holder in a second adjusted position in which said tool holder is turned end for end from said first adjusted position for using a second tool mountable at said second end of said tool holder;
      a third adjustable stop adjacent said locating face and spaced said second distance to one side of said vertical centerline of said locating surface and extending from said one side of said longitudinal centerline and engageable with said second abutment to support said tool holder in a third adjusted position for using a third tool mountable at said first end of said tool holder.

2. A tool holder assembly as claimed in claim 1, wherein said tool holder further includes:
   a fourth adjustable stop adjacent said locating face and spaced said second distance to the opposite side of said vertical centerline of said locating surface and extending from said opposite side of said longitudinal centerline for engagement with said second abutment to support said tool holder in a fourth adjusted position in which said tool holder is turned end for end from said adjusted position for using a fourth tool mountable at said second end of said tool holder.

3. A tool holder assembly, as claimed in claim 1, wherein said tool holder further includes:
   a first recessed central flange extending along a central portion of said longitudinal centerline, formed by relieving the central portion of said locating face on said one side of said vertical centerline and facing in said one side;
   a second recessed central flange extending along a central portion of said longitudinal centerline, formed by relieving the central portion of said locating face on said other side of said vertical centerline and facing said other side;

means defining a pair of apertures through said first central flange for adjustably receiving said first and third stops; and means defining at least one aperture through said second central flange for adjustably receiving said second stop.

4. A tool holder assembly as claimed in claim 3, wherein:

said apertures are threaded; and said stops are set screws.

5. A tool holder assembly as claimed in claim 1, wherein said tool holder further includes:

means defining a longitudinal bore through said tool holder for receiving a cutting tool.

6. A tool holder assembly as claimed in claim 1, wherein said tool holder further includes:

means for releasibly locking said tool holder on said tool block in any one of said adjusted positions.

7. A tool holder assembly for selectively positioning any one of a plurality of tools for use with a lathe, said assembly comprising:

a tool block mountable on a lathe, said tool block including:

first and second generally vertical mounting faces having equal lengths for removably supporting a tool holder;

a first abutment extending from said first mounting face adjacent the lower edge thereof and spaced a first distance from the vertical centerline of said first mounting face;

a second abutment extending from said second mounting face adjacent the lower edge thereof and spaced a second distance from a vertical centerline of said second mounting face; and a tool holder having first and second ends for supporting a plurality of tools and reversibly mountable on either mounting face of said tool block, said tool holder including:

a locating face having a length equal to the length of said first and second mounting faces and selectively engageable with and vertically slidable along either of said first and second mounting faces;

a first recessed central flange extending along a central portion of the longitudinal centerline, formed by relieving the central portion of said locating face on said one side of said vertical centerline and facing said one side;

a second recessed central flange extending along a central portion of said longitudinal centerline, formed by relieving the central portion of said locating face on said other side of said vertical centerline and facing said other side;

means defining a pair of threaded apertures through each of said central flanges;

a first adjustable set screw in a first one of said threaded apertures of said first central flange and spaced said first distance to one side of the vertical centerline of said locating surface and extending from one side of the longitudinal centerline thereof for engagement with said first abutment to support said tool holder in a first adjusted position for using a first tool mountable at said first end of said tool holder;

a second adjustable set screw in a first one of said threaded apertures of said second central flange and spaced said first distance to the opposite side of said vertical centerline of said locating surface and extending from the opposite side of said longitudinal centerline for engagement with said first abutment to support said tool holder in a second adjusted position in which said tool holder is turned end for end from said first adjusted position for using a second tool mountable at said second end of said tool holder;

a third adjustable set screw in a second one of said threaded apertures of said first central flange and spaced said second distance to one side of said vertical centerline of said locating surface and extending from said one side of said longitudinal centerline and engageable with said second abutment to support said tool holder in a third adjusted position for using a third tool mountable at said first and of said tool holder;

a fourth adjustable set screw in a second one of said threaded apertures of said second central flange and spaced said second distance to the opposite side of said vertical centerline of said locating surface and extending from said opposite side of said longitudinal centerline for engagement with the second abutment to support said tool holder in a fourth adjusted position in which said tool holder is turned end for end from said third adjusted position for using a fourth tool mountable at said second end of said tool holder; and means for releasibly locking said tool holder on said tool block in any one of said adjusted positions.

8. A tool holder assembly for selectively positioning any one of a plurality of tools for use with a lathe, said assembly comprising:

a tool block mountable on a lathe, said tool block including:

first and second generally vertical mounting faces having equal lengths for removably supporting a tool holder;

a first abutment extending from said first mounting face adjacent the lower edge thereof and spaced a first distance from the vertical centerline of said first mounting face;

a second abutment extending from said second mounting face adjacent the lower edge thereof and spaced a second distance from a vertical centerline of said second mounting face; and a tool holder having first and second ends for supporting a plurality of tools and reversibly mountable on either mounting face of said tool block, said tool holder including:

a locating face having a length equal to the length of said first and second mounting faces and selectively engageable with and vertically slidable along either of said first and second mounting faces;

a first recessed central flange extending along a central portion of the longitudinal centerline, formed by relieving the central portion of said locating face on said one side of said vertical centerline and facing said one side;

a second recessed central flange extending along a central portion of said longitudinal centerline, formed by relieving the central portion of said locating face on said other side of said vertical centerline and facing said other side;

means defining a pair of threaded apertures through each of said central flanges;

a first pair of set screws, one of said first pair being in one aperture of each central flange extending in opposite directions from the longitudinal centerline of said locating surface and each spaced a first equal distance from the vertical centerline of said locating surface so that said tool holder can be turned end for end on said first mounting face of said tool block to selectively bring either set screw of said first pair into engagement with said first abutment to position respectively first and second tools at opposite ends of said tool holder in work position; and a second pair of set screws, one of said second pair being in one aperture of each central flange extending in opposite directions from the longitudinal centerline of said locating surface and each spaced a second equal distance from the vertical centerline of said locating surface so that said tool holder can be turned end for end on said second mounting face of said tool block to selectively bring either set screw of said second pair into engagement with said second abutment to position respectively third and fourth tools at opposite ends of said tool holder in work position.

* * * * *